(12) United States Patent
Menjak et al.

(10) Patent No.: US 7,533,594 B2
(45) Date of Patent: May 19, 2009

(54) POSITION CONTROL APPARATUS FOR STEERING COLUMN

(75) Inventors: Damir Menjak, Frankenmuth, MI (US); Allan L. Dickinson, Saginaw, MI (US); Melvin L. Tinnin, Clio, MI (US); Troy Daenzer, Reese, MI (US); Richard P. Nash, Frankenmuth, MI (US); Stephen E. Koehr, Birch Run, MI (US)

(73) Assignee: Delphi Technologies, Inc., Troy, MI (US)

( * ) Notice: Subject to any disclaimer, the term of this patent is extended or adjusted under 35 U.S.C. 154(b) by 211 days.

(21) Appl. No.: 11/638,132

(22) Filed: Dec. 13, 2006

(65) Prior Publication Data

US 2008/0143092 A1 Jun. 19, 2008

(51) Int. Cl.
*B62D 1/18* (2006.01)
(52) U.S. Cl. .......................... 74/493; 280/775
(58) Field of Classification Search .................. 74/492, 74/493; 267/70, 167; 280/775
See application file for complete search history.

(56) References Cited

U.S. PATENT DOCUMENTS

| | | | | | |
|---|---|---|---|---|---|
| 1,979,868 | A | * | 11/1934 | Charter | 74/9 |
| 4,433,758 | A | * | 2/1984 | Crossman | 188/196 R |
| 4,434,863 | A | * | 3/1984 | Garrett | 175/321 |
| 4,487,551 | A | * | 12/1984 | Mizutani et al. | 416/135 |
| 4,541,298 | A | * | 9/1985 | Strutt | 74/493 |
| 5,351,572 | A | * | 10/1994 | Vortmeyer | 74/493 |
| 5,722,299 | A | * | 3/1998 | Yamamoto et al. | 74/493 |
| 5,737,971 | A | * | 4/1998 | Riefe et al. | 74/493 |
| 5,918,708 | A | * | 7/1999 | Yuda et al. | 188/67 |
| 6,139,057 | A | | 10/2000 | Olgren et al. | |
| 6,234,040 | B1 | * | 5/2001 | Weber et al. | 74/493 |
| 6,419,269 | B1 | | 7/2002 | Manwaring et al. | |
| 6,460,427 | B1 | * | 10/2002 | Hedderly | 74/493 |
| 6,616,185 | B2 | | 9/2003 | Manwaring et al. | |
| 6,659,504 | B2 | | 12/2003 | Riefe et al. | |
| 6,695,349 | B2 | | 2/2004 | Bohlen et al. | |
| 6,761,376 | B2 | | 7/2004 | Riefe et al. | |
| 2005/0035584 | A1 | | 2/2005 | Camp et al. | |
| 2005/0104353 | A1 | | 5/2005 | Ikeda et al. | |
| 2006/0021460 | A1 | | 2/2006 | Schulz | |

FOREIGN PATENT DOCUMENTS

EP  1 070 652 A2  1/2001

* cited by examiner

*Primary Examiner*—Richard WL Ridley
*Assistant Examiner*—Phillip Johnson
(74) *Attorney, Agent, or Firm*—Thomas N. Twone

(57) ABSTRACT

A position control apparatus for a motor vehicle steering column includes an outer bracket, an inner bracket moveable relative to the outer bracket, and a jacket mounted to the inner bracket for telescoping movement along a longitudinal axis and for tilting movement. A first rack is mounted to the inner bracket and extends along the longitudinal axis. A first pinion is rotatable along the first rack during telescoping movement. A second rack is mounted to the outer bracket and extends angularly relative to the longitudinal axis. A second pinion is rotatable along the second rack during tilting movement. The first pinion has a first locking surface and the second pinion has a second locking surface. The first locking surface and the second locking surface may be engaged with each other to prevent telescoping and tilting movement or may be disengaged from each other to allow telescoping and tilting movement.

20 Claims, 3 Drawing Sheets

POSITION CONTROL APPARATUS FOR STEERING COLUMN

BACKGROUND OF THE INVENTION

1. Field of the Invention

The present invention relates to a position control apparatus for a motor vehicle steering column to selectively lock the steering column against telescoping movement and tilting movement.

2. Description of the Related Art

Motor vehicles manufactured today are frequently equipped with convenience features such as steering columns capable of telescoping movement and tilting movement. Telescoping movement refers to the movement of the steering column along a longitudinal axis of the steering column. Tilting movement refers to the rotational movement of the steering column about a pivot point. Generally, steering columns capable of telescoping and tilting movement include a position control apparatus. The position control apparatus includes an outer bracket having a mounting flange for securing the outer bracket to the vehicle. An inner bracket is coupled to the outer bracket and moveable relative to the outer bracket along the longitudinal axis and about the pivot point. A jacket is mounted to the inner bracket for telescoping movement with the inner bracket relative to the outer bracket along the longitudinal axis and for tilting movement with the inner bracket relative to the outer bracket about the pivot point. The jacket houses components of the steering column including the steering shaft.

The position control apparatus is capable of selectively locking the steering column against telescoping movement and tilting movement. Various types of position control apparatus are known to lock the steering column against telescoping movement and tilting movement. One such position control apparatus includes a compression mechanism for compressing the outer bracket toward the inner bracket to frictionally engage the outer bracket and the inner bracket. However, a high compressive force is required to frictionally engage the outer bracket and the inner bracket, i.e. to lock the steering column against telescoping movement and tilting movement. In other words, the user of the steering column must supply a high input force to supply sufficient compressive force to lock the steering column against telescoping movement and tilting movement. It is undesirable to require the user to supply such an input force and some users may be physically unable to supply a high input force to supply sufficient compressive force. Accordingly, it would be desirable to manufacture a position control apparatus for a steering column that requires a reduced input of force to lock the steering column against telescoping movement and tilting movement.

SUMMARY OF THE INVENTION AND ADVANTAGES

The present invention is a position control apparatus for a steering column of a vehicle. The position control apparatus includes an outer bracket having a mounting flange for securing the outer bracket to the vehicle and an inner bracket coupled to the outer bracket and moveable relative to the outer bracket along a longitudinal axis. A jacket is mounted to the inner bracket for telescoping movement with the inner bracket relative to the outer bracket along the longitudinal axis and for tilting movement with the inner bracket relative to the outer bracket. A telescoping adjustment device is disposed on the inner bracket facilitating telescoping movement of the jacket relative to the outer bracket along the longitudinal axis. A tilting adjustment device is disposed on the outer bracket facilitating tilting movement of the jacket relative to the outer bracket. The telescoping adjustment device has a first locking surface and the tilting adjustment device has a second locking surface. The first locking surface and the second locking surface move between a disengaged position and an engaged position. The disengaged position allows telescoping movement and tilting movement of the jacket relative to the outer bracket. The engaged position locks the jacket against telescoping movement and tilting movement relative to the outer bracket.

Accordingly, the movement of the first and second locking surfaces allows telescoping movement and tilting movement in the disengaged position and locks the jacket against telescoping and tilting movement in the engaged position. A relatively low force is required to move the first locking surface and the second locking surface relative to each other. Additionally, the first pinion and the second pinion may have common dimensions such that the first pinion and the second pinion are interchangeable. This interchangeability of pinions reduces the cost to manufacture the pinions and reduces the cost to assemble

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, a steering column is shown generally at 20. The steering column 20 includes a position control apparatus shown generally at 22.

Figure 1:
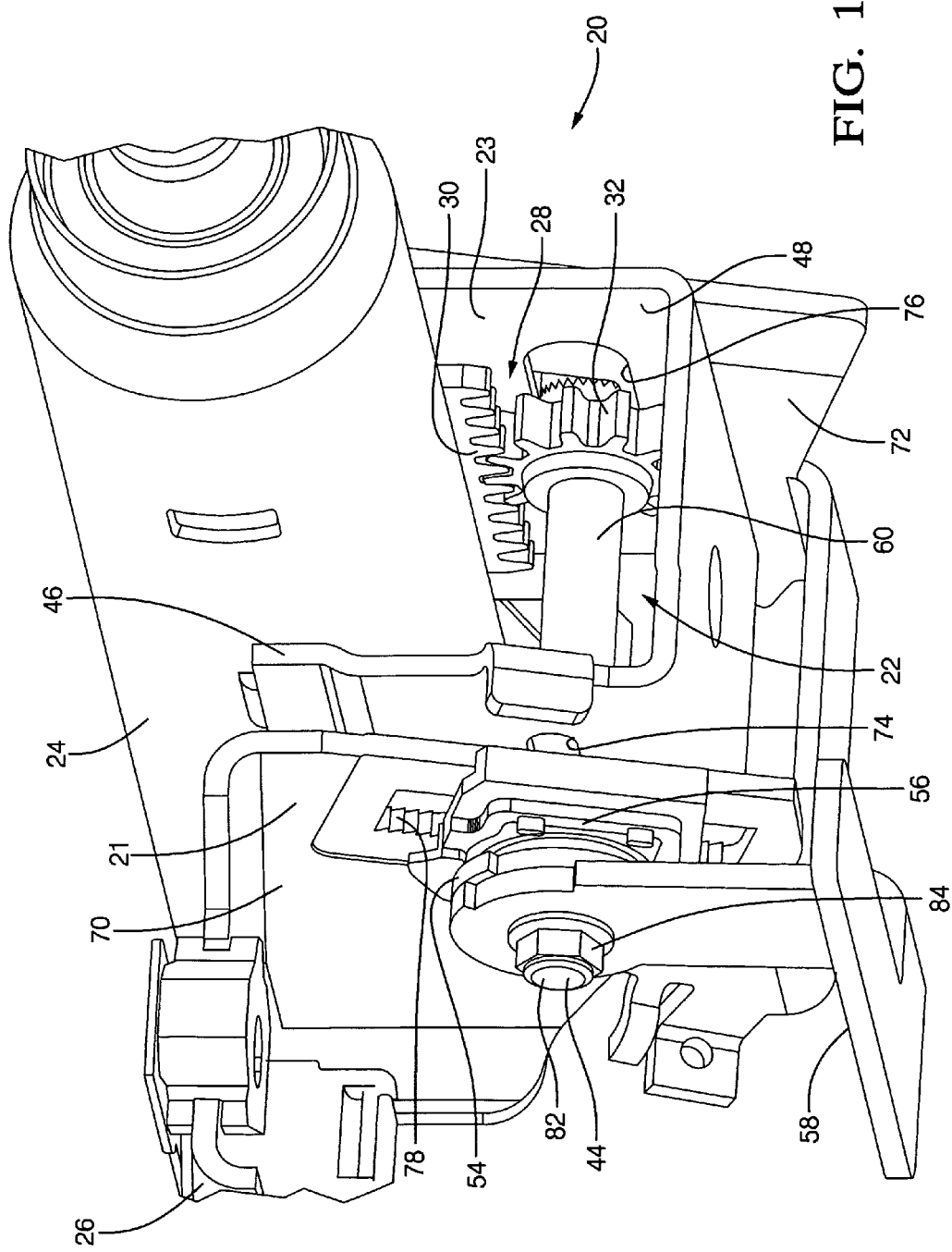
FIG. 1 is a perspective view of a motor vehicle steering column including a position control apparatus.

As shown in FIG. 1, the steering column 20 includes an outer bracket 21, an inner bracket 23 coupled to the outer bracket 21, and a jacket 24 mounted to the inner bracket 23. Specifically, the outer bracket 21 includes a mounting flange 26 for securing the outer bracket 21 to the vehicle. The outer bracket 21 may be secured to the body frame of the vehicle.

Preferably, the mounting flange 26 includes break-away capsules. These breakaway capsules remain attached to the body frame of the vehicle and the remainder of the outside bracket separates from the capsules upon the application of a predetermined force to the jacket 24. For example, the predetermined force may occur during a collision. The jacket 24 houses components of the steering column 20 including the steering shaft. For example, the jacket 24 may be welded to the inner bracket 23. However, it should be appreciated that the jacket 24 may be mounted to the inner bracket 23 by any way known to one skilled in the art.

The inner bracket 23 is coupled to the outer bracket 21 and is moveable relative to the outer bracket 21 along a longitudinal axis A. The jacket 24 is mounted to the inner bracket 23 for telescoping movement with the inner bracket 23 relative to the outer bracket 21 along the longitudinal axis A and for tilting movement with the inner bracket 23 relative to the outer bracket 21. In other words, the jacket 24 and the inner bracket 23 move as a unit relative to the outer bracket 21. Tilting movement is further defined as rotation of the inner bracket 23 relative to the outer bracket 21 about a pivot point (not shown).

A telescoping adjustment device 28 is disposed on the inner bracket 23. The telescoping adjustment device 28 facilitates the telescoping movement of the jacket 24 relative to the outer bracket 21 along the longitudinal axis A. Specifically, the telescoping adjustment device 28 includes a first rack 30 disposed on the inner bracket 23 and a first pinion 32 engaging the first rack 30.

The first rack 30 extends along the longitudinal axis A. The first pinion 32 rotatably moves along the first rack 30 about a rotational axis R during the telescoping movement of the jacket 24 relative to the outer bracket 21 along the longitudinal axis A. The first pinion 32 includes first radial teeth extending radially about the rotational axis R and engaging the first rack 30. The first rack 30 may be integral with the outer bracket 21. Alternatively, the first rack 30 may be fastened to the outer bracket 21. For example, the first rack 30 may be welded to the outer bracket 21. As another example, the first rack 30 may be secured to the outer bracket 21 with threaded fasteners such as screws or bolts. It should be appreciated that the first rack 30 may be secured to the outer bracket 21 in any manner known to one skilled in the art.

A tilting adjustment device 34 is disposed on the outer bracket 21. The tilting adjustment device 34 facilitates tilting movement of the jacket 24 relative to the outer bracket 21. The tilting adjustment device 34 includes a second rack 36 disposed on the outer bracket 21 and a second pinion 38 engaging the second rack 36. The first pinion 32 and the second pinion 38 may have common dimensions such that the first pinion 32 and the second pinion 38 are interchangeable. Such interchangeability may lead to reduction in manufacturing and assembly costs.

The second rack 36 extends at an angle relative to the longitudinal axis A. The second pinion 38 rotatably moves along the second rack 36 about the rotational axis R during the tilting movement of the jacket 24 relative to the outer bracket 21. The second pinion 38 includes second radial teeth extending radially about the rotational axis R and engaging the second rack 36. The second rack 36 may extend at between 45 and 90 degrees relative to the first rack 30. Specifically, the second rack 36 may extend at 75 degrees relative to the first rack 30. The second rack 36 may be integral with the outer bracket 21. Alternatively, the second rack 36 may be fastened to the outer bracket 21. In such a configuration, the first rack 30 and the second rack 36 may have common dimensions such that the first rack 30 and the second rack 36 are interchangeable. Such interchangeability may lead to reduction in manufacturing and assembly costs.

For example, as shown in FIG. 5, the first rack 30 may define holes and the first rack 30 may be secured to the outer bracket 21 with threaded fasteners. The threaded fasteners may be screws, bolts, or any threaded fastener known to one skilled in the art. As another example, the first rack 30 may be welded to the outer bracket 21. It should be appreciated that the first rack 30 may be secured to the outer bracket 21 in any manner known to one skilled in the art.

Figure 2:
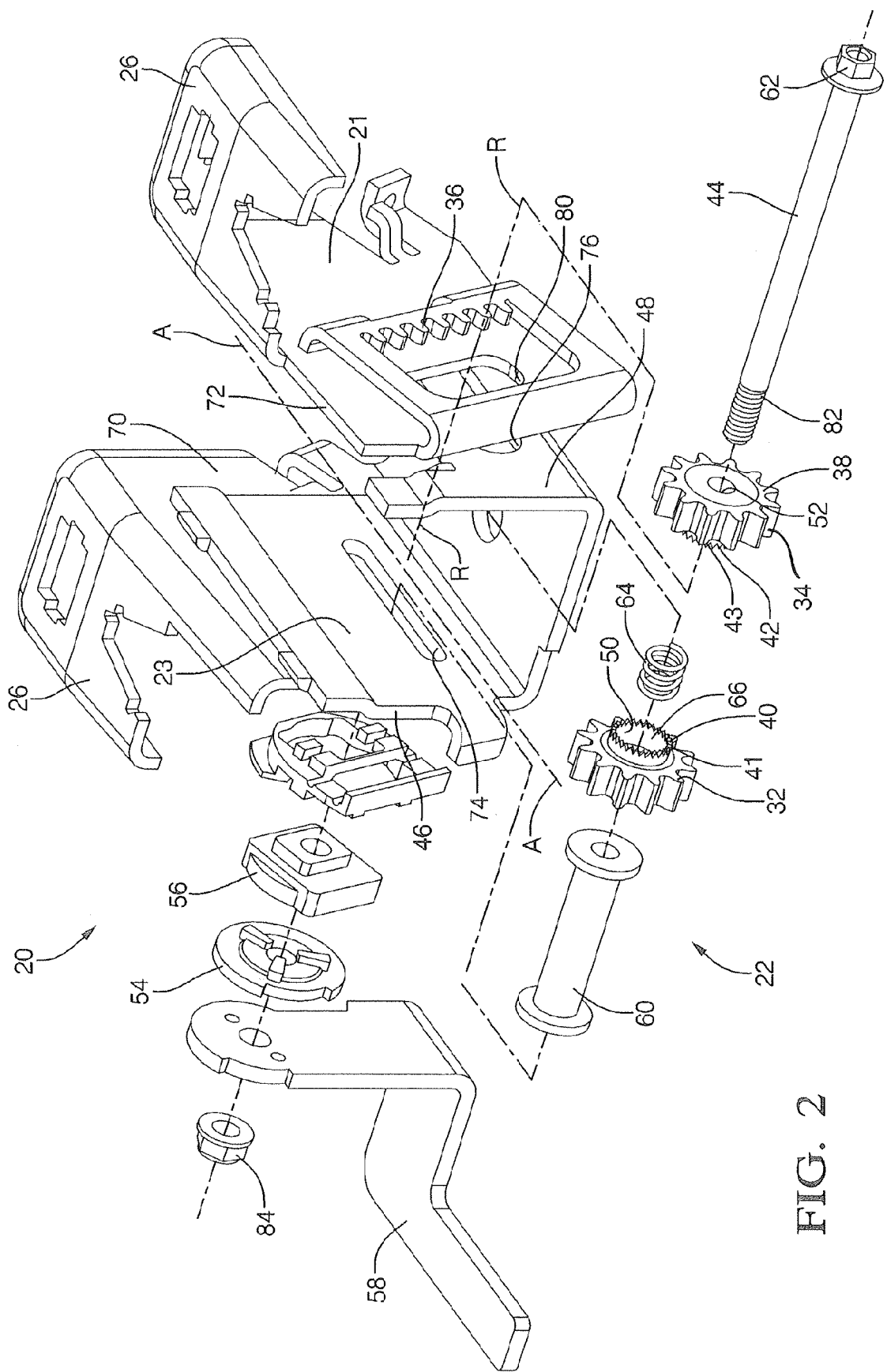
FIG. 2 is an exploded view of a portion of the position control apparatus.
Figure 3:
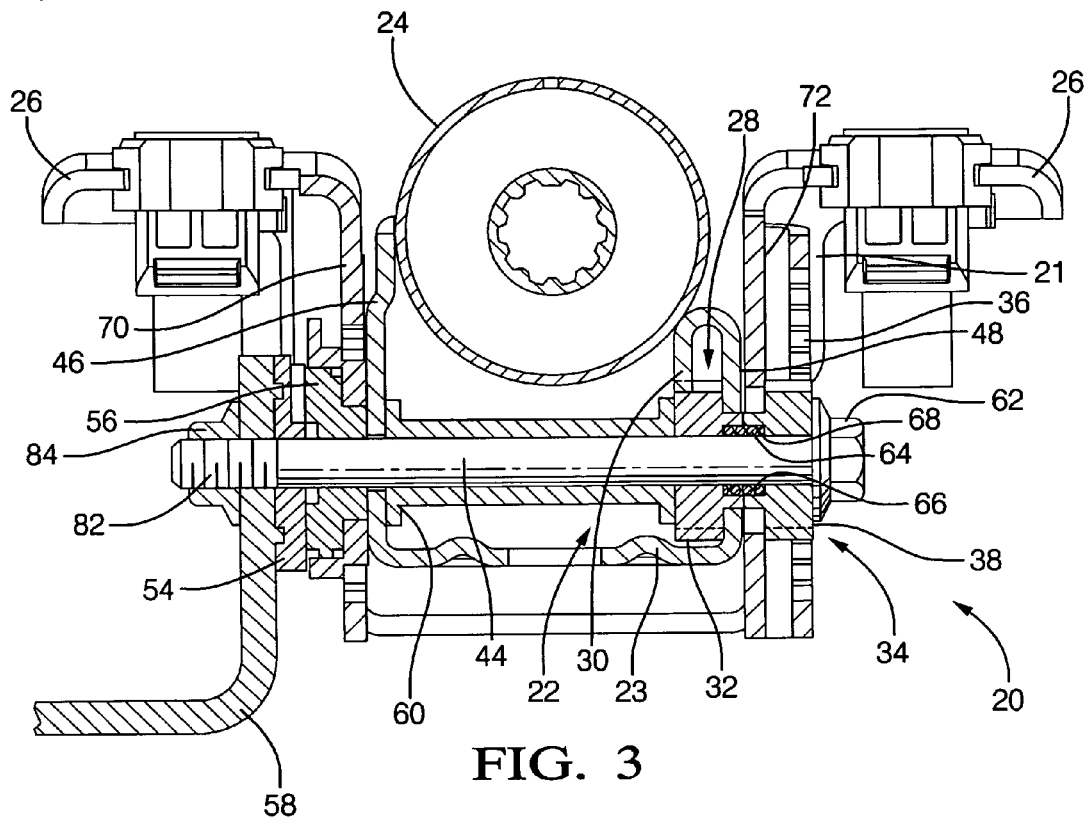
FIG. 3 is a cross-sectional view of the motor vehicle steering column along line 1-1 of FIG. 1 with a first pinion and a second pinion of the position control apparatus in an engaged position.
Figure 4:
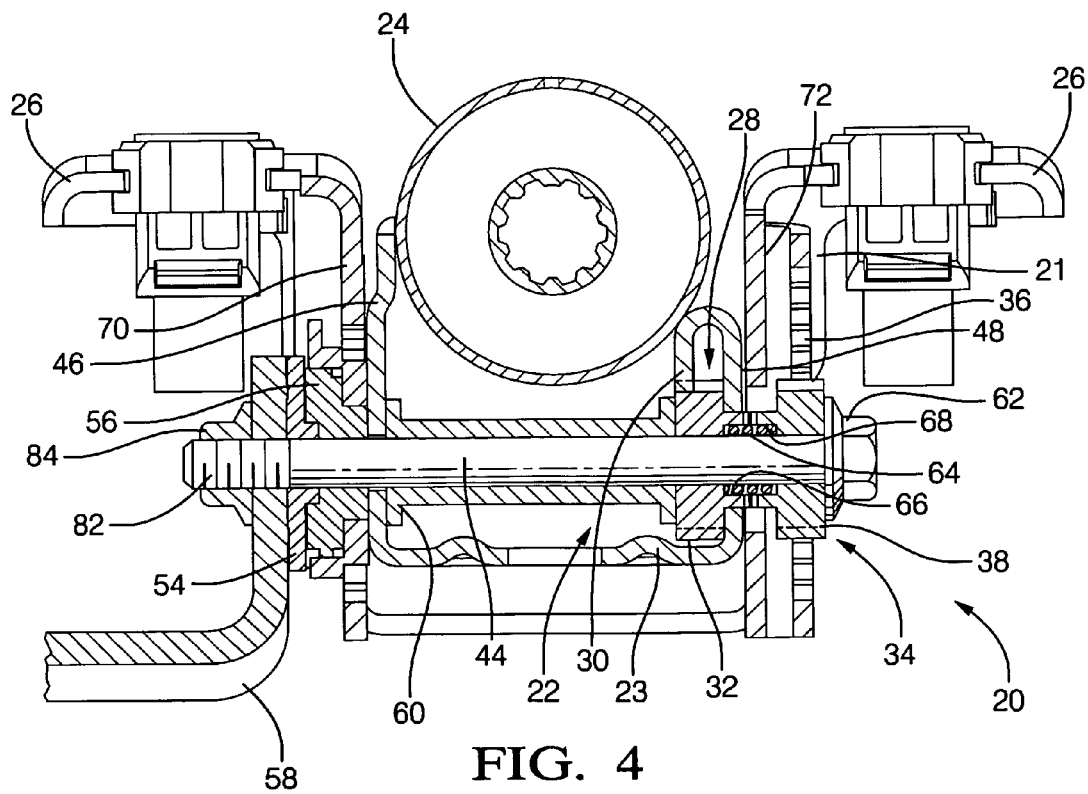
FIG. 4 is a cross-sectional view of the motor vehicle steering column along line 1-1 of FIG. 1 with the first pinion and the second pinion of the position control apparatus in a disengaged position.

The telescoping adjustment device 28 has a first locking surface 40 and the tilting adjustment device 34 has a second locking surface 42. Specifically, the first pinion 32 of the telescoping adjustment device 28 includes the first locking surface 40 and the second pinion 38 of the tilting adjustment device 34 includes the second locking surface 42. As shown in FIGS. 2-4, the first locking surface 40 includes first cogs 41 and the second locking surface 42 includes second cogs 43 opposing the first cogs 41. The first cogs 41 and the second cogs 43 correspond to each other such that the first cogs 41 and the second cogs 43 are capable of meshing with each other.

The first cogs 41 extend from the telescoping adjustment device 28 in a direction toward the tilting adjustment device 34 and the second cogs 43 extend from the tilting adjustment device 34 in a direction toward the telescoping adjustment device 28. Specifically, the first cogs 41 extend from the first pinion 32 in a direction toward the second pinion 38 and the second cogs 43 extend from the second pinion 38 in a direction toward the first pinion 32.

The first locking surface 40 and the second locking surface 42 move between an engaged position and a disengaged position. The disengaged position allows telescoping movement and tilting movement of the jacket 24 relative to the outer bracket 21. The engaged position locks the jacket 24 against telescoping movement and tilting movement relative to the outer bracket 21.

Specifically, the first pinion 32 and the second pinion 38 are moveable between the engaged position, as shown in FIG. 3, and the disengaged position, as shown in FIG. 4. The disengaged position allows rotation of the first pinion 32 relative to the second pinion 38. In other words, in the disengaged position the first pinion 32 and the second pinion 38 are free to rotate. Accordingly, in the disengaged position the inner rack may simultaneously telescope and tilt relative to the outer rack, i.e. simultaneously move along the longitudinal axis A and rotate about the pivot point.

During telescoping movement, the inner bracket 23 moves along the longitudinal axis A relative to the outer bracket 21 and the rod 44. During tilting movement, the inner bracket 23 and the rod 44 rotate about the pivot point as a unit relative the outer bracket 21. Because the jacket 24 is mounted to the inner bracket 23, the jacket 24 moves along the longitudinal axis A with the inner bracket 23 during telescoping movement and rotates about the pivot point with the inner bracket 23 during tilting movement.

As shown in FIG. 3, the first cogs 41 and the second cogs 43 are meshed with one another in the engaged position. The engaged position prevents relative rotation of the first pinion 32 and the second pinion 38 for binding the first pinion 32 and the second pinion 38 and locking the jacket 24 against telescoping movement and tilting movement relative to the outer bracket 21. In other words, because the first pinion 32 is engaged with the first rack 30 and the second pinion 38 is engaged with the second rack 36, and because the second rack 36 extends at an angle relative to the first rack 30, the first pinion 32 and the second pinion 38 bind each other against rotation in the engaged position. The first pinion 32 is bound against rotation between the first rack 30 and the second pinion 38 in the engaged position. The second pinion 38 is bound against rotation between the second rack 36 and the first pinion 32 in the engaged position.

As shown in FIG. 1, the inner bracket 23 is U-shaped including a first leg 46 and a second leg 48 spaced from the first leg 46. The second leg 48 includes the first rack 30 and the first pinion 32 is disposed adjacent the second leg 48.

As shown in FIG. 2, the first pinion 32 defines a first bore 50 about the rotational axis R and the second pinion 38 defines a second bore 52 about the rotational axis R. A rod 44 is rotatably received by the first pinion 32 in the first bore 50 and by the second pinion 38 in the second bore 52.

The rod 44 is slideable in the first bore 50 and the second bore 52 along the rotational axis R. Specifically, a cam follower 54 is mounted to the rod 44. Preferably, a cam 56 is coupled to the outer bracket 21 and remains stationary relative to the outer bracket 21. The cam follower 54 and the rod 44 are rotatable about the rotational axis R relative to the cam 56. The cam follower 54 is moveable along the rotational axis R in response to rotation relative to the cam 56 for sliding the rod 44 in the first bore 50 of the first pinion 32 and the second bore 52 of the second pinion 38. A lever 58 is coupled to the cam follower 54 for rotating the cam follower 54 relative to the cam 56. For example, the cam follower 54 may include protrusions and the lever 58 may include orifices corresponding to the protrusions. In such a configuration, the protrusions engage the orifices such that lever 58 and the cam follower 54 rotate about the rotational axis R as a unit. Alternatively, the cam follower 54 and the lever 58 may be integrally formed.

A spacer 60 extends between the first leg 46 and the second pinion 38 for maintaining the first pinion 32 stationary along the rotational axis R. In other words, the first pinion 32 remains generally stationary along the rotational axis R between the spacer 60 and the second leg 48.

The rod 44 includes a head 62 adjacent the second pinion 38 opposite the second pinion 38 from the first pinion 32. The head 62 is moveable along the rotational axis R. Specifically, the rod 44 moves along the rotational axis R in response to the rotation of the rod 44 and the cam follower 54 about the rotational axis R relative to the cam 56.

The head 62 is moveable along the rotational axis R toward the second pinion 38 for moving the second pinion 38 into the engaged position. In other words, the head 62 forces second pinion 38 toward the first pinion 32. Because the first pinion 32 is stationary along the rotational axis R, the head 62 forces the second pinion 38 toward the first pinion 32 to mesh the first cogs 41 of the first pinion 32 and the second cogs 43 of the second pinion 38.

The head 62 is moveable along the rotational axis R away from the second pinion 38 for allowing movement of the second pinion 38 into the disengaged position. A resilient member 64 is disposed between the first pinion 32 and second pinion 38 for separating the first pinion 32 and the second pinion 38 in the disengaged position. Specifically, the first pinion 32 defines a first cavity 66 about the rotational axis R and the second pinion 38 defines a second cavity 68 about the rotational axis R facing the first cavity 66. The resilient member 64 is disposed in and extends between the first cavity 66 and the second cavity 68. The resilient member 64 may be a coil spring. However, it should be appreciated that the resilient member 64 may be any type of resilient member 64 known to one skilled in the art.

The lever 58 is rotatable about the rotational axis R between a first position, wherein the first pinion 32 and the second pinion 38 are in the engaged position, and a second position, wherein the first pinion 32 and the second pinion 38 are in the disengaged position. In other words, the rotation of the lever 58 controls the telescoping movement and the tilting movement simultaneously. When the lever 58 is in the first position, the jacket 24 is locked against both telescoping movement and tilting movement. When the lever 58 is in the second position, the jacket 24 may simultaneously telescope and tilt relative to the outer bracket 21. Preferably, the lever 58 is rotatable counter-clockwise from the first position to the second position and clockwise from the second position to the first position.

As the lever 58 is rotated from the first position to the second position, the cam 56 and the cam follower 54 are configured such that the head 62 of the rod 44 moves along the rotational axis R away from the second pinion 38. When the rod 44 moves away from the second pinion 38, the first pinion 32 remains stationary along the rotational axis R and the resilient member 64 forces the second pinion 38 along the rotational axis R away from the first pinion 32 to disengage the first pinion 32 and the second pinion 38.

As the lever 58 is rotated from the second position to the first position, the cam 56 and the cam follower 54 are configured such that the head 62 of the rod 44 moves along the rotational axis R toward the second pinion 38. The rod 44 forces the second pinion 38 along the rotational axis R toward the first pinion 32 compressing the resilient member 64 between the first pinion 32 and the second pinion 38. The rod 44 forces the first pinion 32 toward the second pinion 38 to mesh the first cogs 41 of the first pinion 32 with the second cogs 43 of the second pinion 38. The force required to rotate the lever 58 of the current invention from the second position to the first position is less than the force required to lock prior art position adjustment devices 28, 34 including compression mechanisms to frictionally engage the inner bracket 23 and the outer bracket 21. In other words, with respect to the prior art, relatively high compressive forces are required to sufficiently frictionally engage the inner bracket 23 and the outer bracket 21. To the contrary, the force required to move the second pinion 38 along the rotational axis R of the present invention is less than the compressive force required by the prior art.

The outer bracket 21 includes a first wall 70 and a second wall 72. The inner bracket 23 is disposed relative to the outer bracket 21 with first leg 46 of the inner bracket 23 adjacent the first wall 70 of the outer bracket 21 and the second leg 48 of the inner bracket 23 adjacent the second wall 72 of the outer bracket 21. The first leg 46 of the inner bracket 23 defines a first telescoping slot 74 and the second leg 48 of the inner bracket 23 defines a second telescoping slot 76. The first wall 70 of the outer bracket 21 defines a first tilting slot 78 and the second wall 72 of the outer bracket 21 defines a second tilting slot 80.

The first telescoping slot 74 and the second telescoping slot 76 extend generally in parallel with each other. The first tilting slot 78 and the second tilting slot 80 extend generally in parallel with each other. The rod 44 extends through the first and second telescoping slots 76 and through the first and second tilting slots 78, 80. During telescoping movement, the rod 44 moves along the first telescoping slot 74 and the second telescoping slot 76. During tilting movement, the rod 44 moves along the first tilting slot 78 and the second tilting slot 80.

The rod 44 includes a threaded end 82 and the rod 44 extends between the head 62 and the threaded end 82. A nut 84 is threaded onto the threaded end 82 of the rod 44. Specifically, the nut 84 is positioned along the threaded end 82 flush with the lever 58.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A position control apparatus for a steering column of a vehicle, said position control apparatus comprising:
   an outer bracket having a mounting flange for securing said outer bracket to the vehicle;
   an inner bracket coupled to said outer bracket and moveable relative to said outer bracket along a longitudinal axis;
   a jacket mounted to said inner bracket for telescoping movement with said inner bracket relative to said outer bracket along said longitudinal axis and for tilting movement with said inner bracket relative to said outer bracket;
   a telescoping adjustment device disposed on said inner bracket facilitating telescoping movement of said jacket relative to said outer bracket along said longitudinal axis;
   a tilting adjustment device disposed on said outer bracket facilitating tilting movement of said jacket relative to said outer bracket;
   said telescoping adjustment device having a first locking surface and said tilting adjustment device having a second locking surface with at least one of said first locking surface and said second locking surface moving relative to the other between a disengaged position allowing telescoping movement and tilting movement of said jacket relative to said outer bracket and an engaged position locking said jacket against telescoping movement and tilting movement relative to said outer bracket;
   wherein said telescoping adjustment device includes a first rack disposed on said inner bracket and extending along said longitudinal axis and a first pinion engaging said first rack and rotatably moving along said first rack about a rotational axis during said telescoping movement of said jacket relative to said outer bracket along said longitudinal axis;
   wherein said tilting adjustment device includes a second rack disposed on said outer bracket and extending at an angle relative to said longitudinal axis and a second pinion engaging said second rack and rotatably moving along said second rack about said rotational axis during said tilting movement of said jacket relative to said outer bracket; and
   a spacer extending about said rotational axis between said inner bracket and said first pinion for maintaining said first pinion stationary along said rotational axis.

2. The position control apparatus as set forth in claim 1 wherein said first locking surface includes first cogs and said second locking surface includes second cogs opposing said first cogs with said first cogs and said second cogs being meshed with one another in said engaged position.

3. The position control apparatus as set forth in claim 2 wherein said first cogs extend from said telescoping adjustment device in a direction toward said tilting adjustment device and said second cogs extend from said tilting adjustment device in a direction toward said telescoping adjustment device.

4. The position control apparatus as set forth in claim 1 wherein said second rack is fastened to said outer bracket.

5. The position control apparatus as set forth in claim 1 wherein said first pinion includes said first locking surface and said second pinion includes said second locking surface with said first pinion and said second pinion being moveable between said disengaged position allowing rotation of said first pinion relative to said second pinion and said engaged position preventing relative rotation of said first pinion and said second pinion for binding said first pinion and said second pinion and locking said jacket against telescoping movement and tilting movement relative to said outer bracket.

6. The position control apparatus as set forth in claim 1 wherein the inner bracket is U-shaped including a first leg and a second leg spaced from said first leg with said first rack and said first pinion disposed adjacent said second leg and with said spacer extending between said first leg and said first pinion.

7. The position control apparatus as set forth in claim 1 including a rod and wherein said first pinion defines a first bore about said rotational axis and said second pinion defines a second bore about said rotational axis with said rod rotatably received by said first pinion in said first bore and by said second pinion in said second bore and being slideable in said first bore and said second bore along said rotational axis.

8. The position control apparatus as set forth in claim 7 wherein said rod includes a head adjacent said second pinion opposite said second pinion from said first pinion moveable along said rotational axis toward said second pinion for moving said second pinion into said engaged position and moveable along said rotational axis away from said second pinion for allowing movement of said second pinion into said disengaged position.

9. The position control apparatus as set forth in claim 7 including a cam and including a cam follower mounted to said rod with said cam follower and said rod being rotatable about said rotational axis relative to said cam, said cam follower being moveable along said rotational axis in response to rotation relative to said cam for sliding said rod in said first bore of said first pinion and said second bore of said second pinion.

10. The position control apparatus as set forth in claim 9 including a lever coupled to said cam follower for rotating said cam follower relative to said cam.

11. The position control apparatus as set forth in claim 1 including a resilient member disposed between said first pinion and second pinion for separating said first pinion and said second pinion in said disengaged position.

12. The position control apparatus as set forth in claim 11 wherein said resilient member is further defined as a coil spring.

13. The position control apparatus as set forth in claim 11 wherein said first pinion defines a first cavity about said rotational axis and said second pinion defines a second cavity about said rotational axis facing said first cavity with said resilient member disposed in and extending between said first cavity and said second cavity.

14. The position control apparatus as set forth in claim 1 wherein said second rack extends at between 45 and 90 degrees relative to said first rack.

15. The position control apparatus as set forth in claim 14 wherein said second rack extends at 75 degrees relative to said first rack.

16. The position control apparatus as set forth in claim 1 wherein said first rack is integral with said inner bracket and said second rack is integral with said outer bracket.

17. The position control apparatus as set forth in claim 1 wherein said first pinion includes first radial teeth extending radially about said rotational axis and engaging said first rack and said second pinion includes second radial teeth extending radially about said rotational axis and engaging said second rack.

18. A position control apparatus for a steering column of a vehicle, said position control apparatus comprising:
   an outer bracket having a mounting flange for securing said outer bracket to the vehicle;

an inner bracket coupled to said outer bracket and moveable relative to said outer bracket along a longitudinal axis;

a jacket mounted to said inner bracket for telescoping movement with said inner bracket relative to said outer bracket along said longitudinal axis and for tilting movement with said inner bracket relative to said outer bracket;

a first rack disposed on one of said inner bracket and said outer bracket and extending along said longitudinal axis and a first pinion engaging said first rack for rotating about a rotational axis during telescoping movement of said jacket relative to said outer bracket along said longitudinal axis;

a second rack disposed on one of said inner bracket and said outer bracket and extending at an angle relative to said longitudinal axis and a second pinion engaging said second rack for rotating about said rotational axis during tilting movement of said jacket relative to said outer bracket;

wherein said first pinion includes a first locking surface and said second pinion includes a second locking surface with said first pinion and said second pinion being moveable between a disengaged position allowing rotation of said first pinion relative to said second pinion and an engaged position preventing relative rotation of said first pinion and said second pinion for binding said first pinion and said second pinion and locking said jacket against telescoping movement and tilting movement relative to said outer bracket a spacer extending about said rotational axis between said inner bracket and said first pinion for maintaining said first pinion stationary along said rotational axis.

19. The position control apparatus as set forth in claim 18 wherein said first locking surface includes first cogs and said second locking surface includes second cogs opposing said first cogs with said first cogs and said second cogs being meshed with one another in said engaged position.

20. The position control apparatus as set forth in claim 18 wherein the inner bracket is U-shaped including a first leg and a second leg spaced from said first leg with said first rack and said first pinion disposed adjacent said second leg and with said spacer extending between said first leg and said first pinion.

* * * * *